United States Patent
Ji et al.

(10) Patent No.: US 11,303,528 B2
(45) Date of Patent: Apr. 12, 2022

(54) COMMUNICATIONS CONNECTION DETECTION METHOD AND APPARATUS

(71) Applicant: Huawei Technologies Co., Ltd., Shenzhen (CN)

(72) Inventors: Yeyi Ji, Nanjing (CN); Yulei Zhang, Nanjing (CN); Liang Zang, Nanjing (CN); Bizhen Liu, Nanjing (CN); Honghao Zhu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 16/825,544

(22) Filed: Mar. 20, 2020

(65) Prior Publication Data

US 2020/0220785 A1    Jul. 9, 2020

Related U.S. Application Data (63) Continuation of application No. PCT/CN2018/105975, filed on Sep. 17, 2018.

(30) Foreign Application Priority Data

Sep. 22, 2017   (CN) .......................... 201710866379.8

(51) Int. Cl.
   *H04L 12/24* (2006.01)
   *H04L 12/46* (2006.01)
   *H04L 41/12* (2022.01)

(52) U.S. Cl.
   CPC .............. *H04L 41/12* (2013.01); *H04L 12/46* (2013.01)

(58) Field of Classification Search
   CPC ................ H04L 41/12; H04L 12/46
   (Continued)

(56) References Cited

U.S. PATENT DOCUMENTS

| 7,944,926 B2 * | 5/2011 | Zhang | H04L 45/56 370/395.31 |
| 2003/0112808 A1 * | 6/2003 | Solomon | H04L 12/4633 370/400 |
| 2006/0168317 A1 * | 7/2006 | Charzinski | H04L 45/22 709/238 |

(Continued)

FOREIGN PATENT DOCUMENTS

| CN | 102104532 A | 6/2011 |
| CN | 102355416 A | 2/2012 |

(Continued)

OTHER PUBLICATIONS

Cisco Systems, Inc., "Scalable DMVPN Design and Implementation Gdide," XP055520802, Retrieved from the Internet:URL:https://www.cisco.com/c/dam/en/us/products/collateral/security/dynamic-multipoint-vpn-dmvpn/dmvpn_design_guide.pdf#wp37674 [retrieved on Nov. 2, 2018], Dec. 31, 2007, 114 pages.

(Continued)

*Primary Examiner* — James E Springer
(74) *Attorney, Agent, or Firm* — Conley Rose, P.C.

(57) ABSTRACT

A communications connection detection method includes sending, by a first network node, a detection request packet to a second network node, where the detection request packet is used to detect whether the first network node and the second network node are in a connected mode, deleting, by the first network node, a next hop resolution protocol (NHRP) table between the first network node and the second network node when the first network node determines that the first network node does not receive a detection response packet sent by the second network node.

20 Claims, 7 Drawing Sheets

(58) Field of Classification Search
USPC .......................................................... 370/254
See application file for complete search history.

(56) References Cited

U.S. PATENT DOCUMENTS

| | | | |
|---|---|---|---|
| 2008/0155677 A1* | 6/2008 | Hossain | .............. H04L 63/1433 |
| | | | 726/15 |
| 2009/0304003 A1 | 12/2009 | Huynh Van et al. | |
| 2010/0142410 A1* | 6/2010 | Huynh Van | ......... H04L 12/4641 |
| | | | 370/255 |
| 2010/0281168 A1* | 11/2010 | Li | ........................... H04L 45/00 |
| | | | 709/227 |
| 2012/0320796 A1* | 12/2012 | Xia | ........................ H04L 45/02 |
| | | | 370/254 |
| 2014/0012635 A1 | 1/2014 | Joyce et al. | |
| 2014/0126351 A1 | 5/2014 | Tatsumi | |
| 2017/0053258 A1* | 2/2017 | Carney | ................ H04L 45/306 |
| 2020/0220774 A1* | 7/2020 | Shi | .......................... H04L 45/28 |

FOREIGN PATENT DOCUMENTS

| | | | | |
|---|---|---|---|---|
| CN | 104579736 A | | 4/2015 | |
| CN | 107612776 A | | 1/2018 | |
| WO | WO-2016082412 A1 | * | 6/2016 | ............. H04L 41/00 |

OTHER PUBLICATIONS

Mao, Y., "Auto Discovery VPN Protocal," draft-mao-ipsecme-ad-vpn-protocol-02,txt, XP015093550, Aug. 18, 2013, 30 pages.
Luciani, J. et al., "NBMA Next Hop Resolution Protocol (NHRP)" RFC 2332, Apr. 1998, 52 pages.

\* cited by examiner

| 0 bits | 8 bits | 16 bits | 24 bits | 32 bits |
|---|---|---|---|---|
| colspan="2" | afnum (indicates a link layer address type) | colspan="3" | protocol_type (indicates a protocol type) |
| | snap |
| snap | hop_count (indicates a maximum quantity of hops allowed for an HNRP data traffic packet) | colspan="3" | packet_size (indicates a packet size) |
| colspan="2" | checksum (checksum) | colspan="3" | extension_offset (used to indicate an NHRP extension field) |
| version (version) | type=9 (indicates that a packet type is an NHRP packet) | colspan="2" | src_nbma_address_len (source NBMA address length) | src_nbma_subaddress_len (source NBMA subnet address length) |
| src_protocol_address_len (source protocol address length) | dst_protocol_address_len (destination protocol address length) | colspan="3" | flags (flag bit, used to indicate a packet type) |
| | request id (request packet ID) |
| | src_nbma_address (source NBMA address) |
| | src_protocol_address (source protocol address) |
| | dst_protocol_address (destination protocol address) |
| C | U | colspan="2" | Type=10 (extension type) | length (sequence number length) |
| | sequence number (sequence number) |

COMMUNICATIONS CONNECTION DETECTION METHOD AND APPARATUS

CROSS-REFERENCE TO RELATED APPLICATIONS

This application is a continuation of International Patent Application No. PCT/CN2018/105975 filed on Sep. 17, 2018, which claims priority to Chinese Patent Application No. 201710866379.8 filed on Sep. 22, 2017. The disclosures of the aforementioned applications are hereby incorporated by reference in their entireties.

TECHNICAL FIELD

This application relates to the field of information technologies, and in particular, to a communications connection detection method and apparatus.

BACKGROUND

An auto discovery virtual private network (DVPN) allows a hub node as a central node to use a static Internet Protocol (IP) address, and a router (spoke) node as a branch node may use a dynamic IP address. The hub node establishes a static tunnel with each spoke node using a multipoint generic routing encapsulation (mGRE) protocol interface. Data traffic between spoke nodes may be transmitted using a dynamic tunnel established between the spoke nodes, and does not need to be forwarded by a hub node, thereby reducing overheads of the hub node.

The dynamic tunnels between the spoke nodes may be established using a next hop resolution protocol (NHRP). The NHRP protocol is used to resolve a problem of how a source spoke node obtains a dynamic public IP address of a destination spoke node.

An existing solution only resolves a keepalive problem between the spoke node and the hub node. However, in other approaches, there is no effective way to resolve a problem of how to restore the data traffic between the spoke nodes after a link between the spoke nodes is interrupted.

SUMMARY

This application provides a communications connection detection method and apparatus, to provide an effective way to restore transmission of data traffic between spoke nodes.

According to a first aspect, an embodiment of this application provides a communications connection detection method, including sending, by a first network node, a detection request packet to a second network node, where the detection request packet is used to detect whether the first network node and the second network node are in a connected mode, and deleting, by the first network node, an NHRP table when the first network node determines that the first network node does not receive a detection response packet sent by the second network node, where the detection response packet is a response packet in response to the detection request packet, and the NHRP table is used to forward data traffic between the first network node and the second network node.

Currently, when a link fault occurs between the two nodes, the NHRP table between the first network node and the second network node does not automatically disappear before the NHRP table ages. Before the NHRP table ages, the first network node still sends the data traffic between the first network node and the second network node based on the NHRP table such that a transmission resource of the first network node is occupied. According to the manner provided in this embodiment of this application, the first network node serves as a detection initiation device, and after determining that the first network node does not receive the detection response packet sent by the second network node, deletes the NHRP table used to forward the data traffic between the first network node and the second network node. In this way, when a link fault occurs between the two nodes, it can be ensured that the data traffic is no longer sent and the transmission resource is no longer occupied.

In this embodiment of this application, when both the first network node and the second network node are branch nodes, after the first network node deletes the NHRP table between the first network node and the second network node, the NHRP table is no longer queried, and the data traffic transmitted between the first network node and the second network node is forwarded by a central node, where the NHRP table is used by the first network node to forward data traffic to the second network node using a tunnel established between the first network node and the second network node. In this way, after a fault occurs in the tunnel established between the first network node and the second network node, transmission of the data traffic between the first network node and the second network node is restored.

The foregoing method may be applied without being limited to an mGRE protocol tunnel network. Certainly, other networking modes in which NHRP can be applied are all applicable to this embodiment of this application.

In a possible design, when the first network node does not receive data traffic sent by the second network node, the first network node sends the detection request packet to the second network node. When the first network node can receive the data traffic transmitted by the second network node, it can be determined that the link between the first network node and the second network node is normal. Therefore, when the first network node does not receive the data traffic transmitted by the second network node, that is, when data traffic receiving is stopped, the first network node may send the detection request package to the second network node. In this way, whether the traffic between the two nodes is stopped because of a link fault can be determined in advance, thereby improving reliability of discovering the link fault.

In a possible implementation, when the first network node does not receive, within first preset duration, data traffic sent by the second network node, the first network node sends the detection request packet to the second network node. A reason why the first network node does not receive the data traffic sent by the second network node may be that the data traffic sent by the second network node to the first network node is transmitted completely. Therefore, the first network node may send the detection request packet to the second network node when duration in which the first network node does not receive the data traffic sent by the second network node reaches the first preset duration, that is, when duration in which data traffic receiving is stopped reaches the first preset duration. In this way, whether the traffic between the two nodes is stopped because of a link fault can be determined in advance, thereby improving reliability of discovering the link fault.

In a possible design, when the first network node does not receive data traffic sent by the second network node and stops sending data traffic to the second network node, the first network node sends the detection request packet to the second network node. When the first network node does not receive the data traffic sent by the second network node, the first network node does not trigger sending of the detection request packet if the first network node is sending the data traffic to the second network node, and the first network node sends the detection request packet to the second network node only when the first network node stops sending the data traffic to the second network node. In other words, the first network node sends the detection request packet to the second network node only when the first network node does not send the data traffic to the second network node and does not receive the data traffic sent by the second network node.

In a possible design, when duration in which the first network node does not receive data traffic sent by the second network node and stops sending data traffic to the second network node exceeds second preset duration, the first network node sends the detection request packet to the second network node.

In a possible design, that the first network node determines that the first network node does not receive a detection response packet sent by the second network node includes determining, by the first network node, that the detection response packet sent by the second network node is not received within third preset duration, or determining, by the first network node, that the detection response packet sent by the second network node is not received within third preset duration, and that the detection response packet sent by the second network node is not received after the detection request packet is repeatedly sent to the second network node for N times, where N is an integer greater than 1.

The foregoing design provides two simple and effective manners for determining that the first network node does not receive the detection response packet sent by the second network node.

In a possible design, the detection request packet is an NHRP packet, the NHRP packet includes a first field, and the first field is used to indicate that the NHRP packet is a packet used to detect whether the first network node and the second network node are in a connected mode.

In the foregoing design, a protocol packet existing in an mGRE tunnel network, that is, an NHRP protocol packet, is used, without a need to configure another detection packet, such as a bidirectional forwarding detection (BFD) packet, for each node in the network, thereby saving resources of the nodes.

In a possible design, the NHRP packet further includes a second field, and the second field is used by the second network node to detect whether the detection request packet is secure. This improves security of the detection request packet, thereby improving link security.

In a possible design, the NHRP packet further includes a third field, the third field is used to indicate a sequence number of the NHRP packet, and the sequence number is used to indicate whether the NHRP packet is a replay packet. This protects, to some extent, the second network node from being attacked.

In a possible design, the detection request packet is a dead peer detection (DPD) packet. An IP security association technology is used in an mGRE tunnel network. Therefore, a DPD packet of the IP security association technology is used, without a need to configure another detection packet, such as BFD, for each node in the network, thereby saving resources of the nodes.

In a possible design, when the first network node determines that the first network node does not receive the detection response packet sent by the second network node, the method further includes deleting, by the first network node, IP security association information, where the IP security association information is used to encrypt the data traffic transmitted between the first network node and the second network node.

In the foregoing design, when a fault occurs in a transmission link between the first network node and the second network node, the IP security association information is deleted in time, thereby saving storage resources of the nodes.

In a possible design, both the first network node and the second network node are branch nodes. When the first network node determines that the first network node does not receive the detection response packet sent by the second network node, the first network node deletes the NHRP table between the first network node and the second network node, and the first network node restores an aggregated routing function between the first network node and the central node, where the aggregated routing function is used to forward, using the central node, the data traffic transmitted between the first network node and the second network node.

According to the foregoing design, after a link fault occurs between the two branch nodes, forwarding by the central node may be restored, thereby restoring transmission of the data traffic between the branch nodes.

In a possible design, when the first network node determines that the first network node does not receive the detection response packet sent by the second network node, the method further includes sending, by the first network node, an alarm signal, where the alarm signal is used to indicate that a fault occurs in the transmission link between the first network node and the second network node.

According to the foregoing design, when a fault occurs in the transmission link between the first network node and the second network node, a user may be reminded such that the user can repair the link fault in time.

According to a second aspect, based on a same concept as the foregoing embodiment of the first aspect, an embodiment of this application provides a communications connection detection apparatus, where the apparatus is applied to a first network node, and includes a first sending module configured to send a detection request packet to a second network node, where the detection request packet is used to detect whether the first network node and the second network node are in a connected mode, a first receiving module configured to receive a detection response packet sent by the second network node, and a processing module configured to delete, by the first network node, an NHRP table when determining that the first receiving module does not receive the detection response packet sent by the second network node such that data traffic transmitted between the first network node and the second network node is forwarded by a central node, where the NHRP table is used by the first network node to forward data traffic to the second network node using a tunnel established between the first network node and the second network node.

In the foregoing manner, the first network node serves as a detection initiation device, and after determining that the second network node does not receive the detection request packet, deletes the NHRP table used to forward the data traffic between the first network node and the second network node. In this way, when a link fault occurs between the two nodes, it can be ensured that the data traffic is no longer sent and a transmission resource is no longer occupied.

In a possible design, the apparatus further includes a second receiving module configured to receive data traffic sent by the second network node, and a second sending module configured to send data traffic to the second network node, where the first sending module is further configured to send the detection request packet to the second network node when it is determined that any one of the following conditions is met: the second receiving module does not receive the data traffic sent by the second network node, the second receiving module does not receive, within first preset duration, the data traffic sent by the second network node, the second receiving module does not receive the data traffic sent by the second network node, and the second sending module does not send the data traffic to the second network node, or duration in which the second receiving module does not receive the data traffic sent by the second network node and the second sending module does not send the data traffic to the second network node exceeds second preset duration.

According to the foregoing design, reliability of discovering the link fault can be improved.

In a possible design, when determining that the first receiving module does not receive the detection response packet sent by the second network node, the processing module is further configured to determine that the first receiving module does not receive, within third preset duration, the detection response packet sent by the second network node, or determine that the first receiving module does not receive, within third preset duration, the detection response packet sent by the second network node, and that after the first sending module repeatedly sends the detection request packet to the second network node for N times, the first receiving module does not receive the detection response packet sent by the second network node, where N is an integer greater than 1.

The foregoing design provides two simple and effective manners for determining that the first receiving module does not receive the detection response packet sent by the second network node.

In a possible design, the detection request packet is an NHRP packet, the NHRP packet includes a first field, and the first field is used to indicate that the NHRP packet is a packet used to detect whether the first network node and the second network node are in a connected mode. In the foregoing design, a protocol packet existing in an mGRE tunnel network, that is, an NHRP protocol packet, is used, without a need to configure another detection packet, such as BFD, for each node in the network, thereby saving resources of the nodes.

In a possible design, the NHRP packet further includes a second field, and the second field is used by the network node to detect whether the detection request packet is secure. This improves security of the detection request packet, thereby improving link security.

In a possible design, the NHRP packet further includes a third field, the third field is used to indicate a sequence number of the NHRP packet, and the sequence number is used to indicate whether the NHRP packet is a replay packet. This protects, to some extent, the network node from being attacked.

In a possible design, the detection request packet is a dead peer detection DPD packet. An IP security association technology is used in an mGRE tunnel network. Therefore, a DPD packet of the IP security association technology is used, without a need to configure another detection packet, such as BFD, for each node in the network, thereby saving resources of the nodes.

In a possible design, the processing module is further configured to delete IP security association information when determining that the first receiving module does not receive the detection response packet sent by the second network node, where the IP security association information is used to encrypt the data traffic transmitted between the first network node and the second network node. In the foregoing design, when a fault occurs in a transmission link between the first network node and the second network node, the IP security association information is deleted in time, thereby saving storage resources of the nodes.

In a possible design, both the first network node and the second network node are branch nodes. The processing module is further configured to restore an aggregated routing function between the first network node and the central node when determining that the first receiving module does not receive the detection response packet sent by the second network node, where the aggregated routing function is used by the processing module to forward, using the central node, the data traffic transmitted between the first network node and the second network node. According to the foregoing design, after a link fault occurs between the two branch nodes, forwarding by the central node may be restored, thereby restoring transmission of the data traffic between the branch nodes.

In a possible design, the processing module is further configured to send an alarm signal when determining that the first receiving module does not receive the detection response packet sent by the second network node, where the alarm signal is used to indicate that a fault occurs in the transmission link between the first network node and the second network node. According to the foregoing design, when a fault occurs in the transmission link between the first network node and the second network node, a user may be reminded such that the user can repair the link fault in time.

According to a third aspect, an embodiment of this application provides a communications connection detection network node, including a communications interface, a memory, and a processor, where the communications interface is configured to send and receive data, the memory is configured to store a program executed by the processor, and the processor is configured to execute the program stored in the memory, and send and receive data using the communications interface, to implement the method according to any design of the first aspect.

According to a fourth aspect, an embodiment of this application provides a computer storage medium, where the computer readable storage medium stores a computer executable instruction, and the computer executable instruction is used to enable the computer to execute the method according to any design of the first aspect.

According to a fifth aspect, an embodiment of this application provides a chip, where the chip is connected to a memory, and is configured to read and execute a software program stored in the memory, to implement the method according to any design of the first aspect.

DESCRIPTION OF EMBODIMENTS

Embodiments of this application propose a communications connection detection method and apparatus. When a tunnel established between a first network node and a second network node is faulty, an NHRP table is deleted such that when a link fault occurs between the two nodes, it can be ensured that data traffic is no longer sent and a transmission resource is no longer occupied. Further, forwarding, by a central node, of data traffic transmitted between the first network node and the second network node may be triggered, thereby restoring transmission of the data traffic between the first network node and the second network node. The method and the apparatus are based on a same concept. The method and the apparatus have similar problem-resolving principles. Therefore, for implementations of the apparatus and the method, reference may be made to each other. Details are not described repeatedly.

Figure 1:
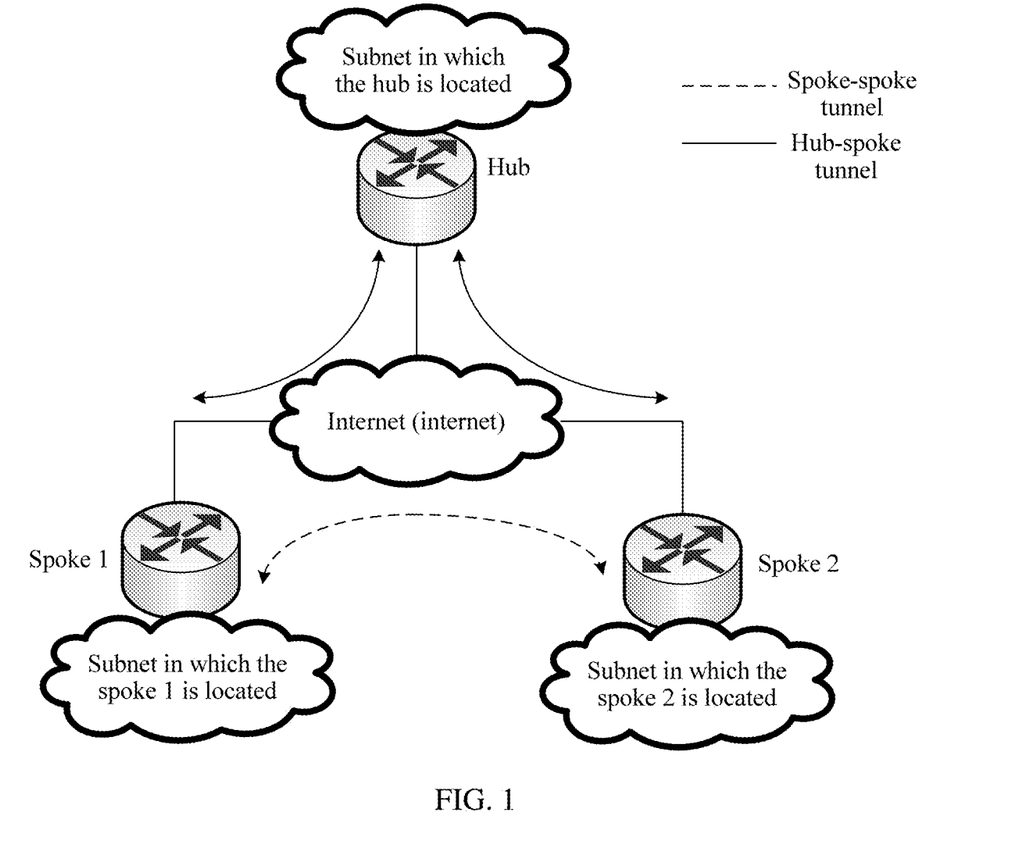
FIG. 1 is an architectural diagram of an mGRE tunnel network according to an embodiment of this application.

The communications connection detection method and apparatus proposed in the embodiments of this application may be applied without being limited to a mGRE tunnel network, and other networking modes in which an NHRP protocol can be applied are all applicable to this application. In the embodiments of this application, that the communications connection detection method and apparatus are applied to the mGRE tunnel network is used as an example for description. The mGRE tunnel network includes one central node and a plurality of branch nodes. As shown in FIG. 1, an mGRE tunnel network includes one central node, for example, a hub node in FIG. 1, and further includes two branch nodes, for example, a spoke 1 and a spoke 2 in FIG. 1. A hub-spoke tunnel is established between the hub node and each of the two spoke nodes, and a spoke-spoke tunnel is established between the spoke 1 and the spoke 2 based on the NHRP protocol. Data traffic between the spoke 1 and the spoke 2 may be transmitted using the spoke-spoke tunnel.

A network node mentioned in the embodiments of this application may be a central node or may be a branch node. "A plurality of" mentioned in the embodiments of this application means two or more.

In addition, it should be understood that, in the description of this application, terms such as "first" and "second" are used only for distinguishing between descriptions, but cannot be understood as an indication or implication of relative importance, and cannot be understood as an indication or implication of a sequence.

To make the objectives, technical solutions, and advantages of this application clearer, the following further describes this application in detail with reference to the accompanying drawings.

Figure 2:
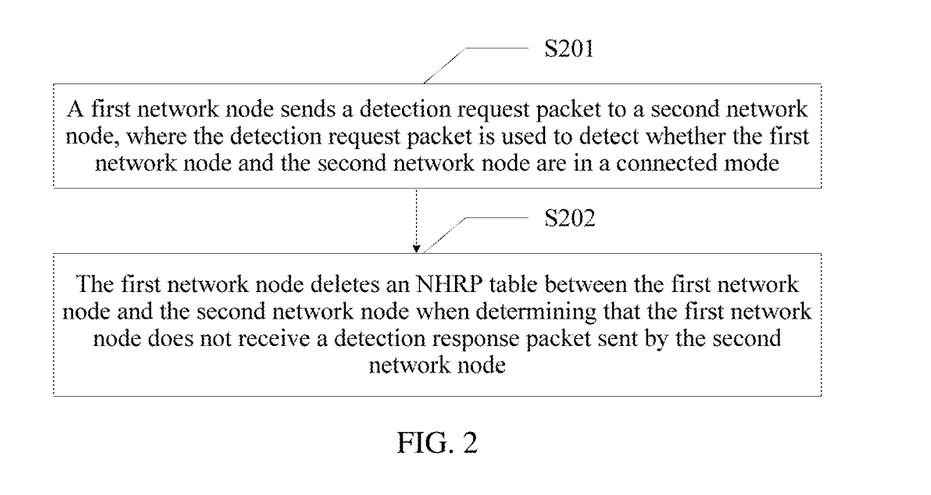
FIG. 2 is a flowchart of a communications connection detection method according to an embodiment of this application.

FIG. 2 is a schematic flowchart of a communications connection detection method according to an embodiment of this application. The method includes the following steps.

S201. A first network node sends a detection request packet to a second network node, where the detection request packet is used to detect whether the first network node and the second network node are in a connected mode. After the first network node sends the detection request packet to the second network node, when receiving the detection request packet sent by the first network node, the second network node sends a detection response packet to the first network node. The detection response packet is a response packet in response to the detection request packet.

S202. The first network node deletes an NHRP table between the first network node and the second network node when the first network node determines that the first network node does not receive the detection response packet sent by the second network node, where the NHRP table is used to forward data traffic between the first network node and the second network node.

Currently, when a link fault occurs between the two nodes, the NHRP table between the first network node and the second network node does not automatically disappear before the NHRP table ages. Before the NHRP table ages, the first network node still sends the data traffic between the first network node and the second network node based on the NHRP table such that a transmission resource of the first network node is occupied. According to the manner provided in this embodiment of this application, the first network node serves as a detection initiation device, and after determining that the second network node does not receive the detection request packet, deletes the NHRP table used to forward the data traffic between the first network node and the second network node. In this way, when a link fault occurs between the two nodes, it can be ensured that the data traffic is no longer sent and the transmission resource of the first network node is no longer occupied.

In this embodiment of this application, when both the first network node and the second network node are branch nodes, the NHRP table between the first network node and the second network node is used by the first network node to forward data traffic to the second network node using a tunnel established between the first network node and the second network node. Based on this, the first network node deletes the NHRP table between the first network node and the second network node. In other words, when the first network node determines that the data traffic needs to be sent to the second network node, the NHRP table between the first network node and the second network node is no longer queried such that the data traffic transmitted between the first network node and the second network node needs to be directed to a central node. This further ensures that when a fault occurs in the tunnel established between the first network node and the second network node, transmission of the data traffic between the first network node and the second network node is restored.

In this embodiment of this application, when both the first network node and the second network node are branch nodes, when determining that the first network node does not receive the detection response packet sent by the second network node, the first network node deletes the NHRP table used to forward the data traffic between the first network node and the second network node. In a first manner, an aggregated routing function is restored by default after the NHRP table is deleted, where the aggregated routing function is used to forward, using the central node, the data traffic transmitted between the first network node and the second network node. In a second manner, an aggregated routing function is not restored by default after NHRP table is deleted. In the second manner, after the first network node deletes the NHRP table used to forward the data traffic between the first network node and the second network node, an aggregated routing function between the first network node and the central node is restored. In this way, after a link fault occurs between the two branch nodes, forwarding by the central node may be restored, thereby restoring transmission of the data traffic between the branch nodes.

In this embodiment of this application, that the first network node determines that the first network node does not receive the detection response packet sent by the second network node may be implemented in the following manners.

Implementation 1.

The first network node determines that the detection response packet sent by the second network node is not received within third preset duration. Specifically, when the detection response packet sent by the second network node is not received within the third preset duration after the first network node sends the detection request packet to the second network node, the NHRP table between the first network node and the second network node is deleted.

Implementation 2.

The first network node determines that the detection response packet sent by the second network node is not received within third preset duration, and that after the detection request packet is repeatedly sent to the second network node for N times, the detection response packet sent by the second network node is not received. Specifically, if the detection response packet sent by the second network node is not received within the third preset duration after the first network node sends the detection request packet to the second network node, the detection request packet is resent. If the detection response packet sent by the second network node is not received after the detection request packet is repeatedly sent for N times, the first network node deletes the NHRP table between the first network node and the second network node.

Figure 3A:
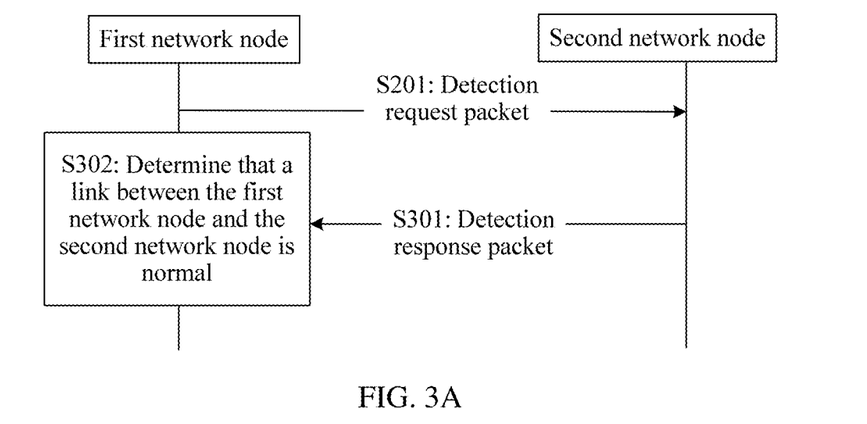
FIG. 3A is a schematic flowchart of a communications connection detection method according to an embodiment of this application.
Figure 3B:
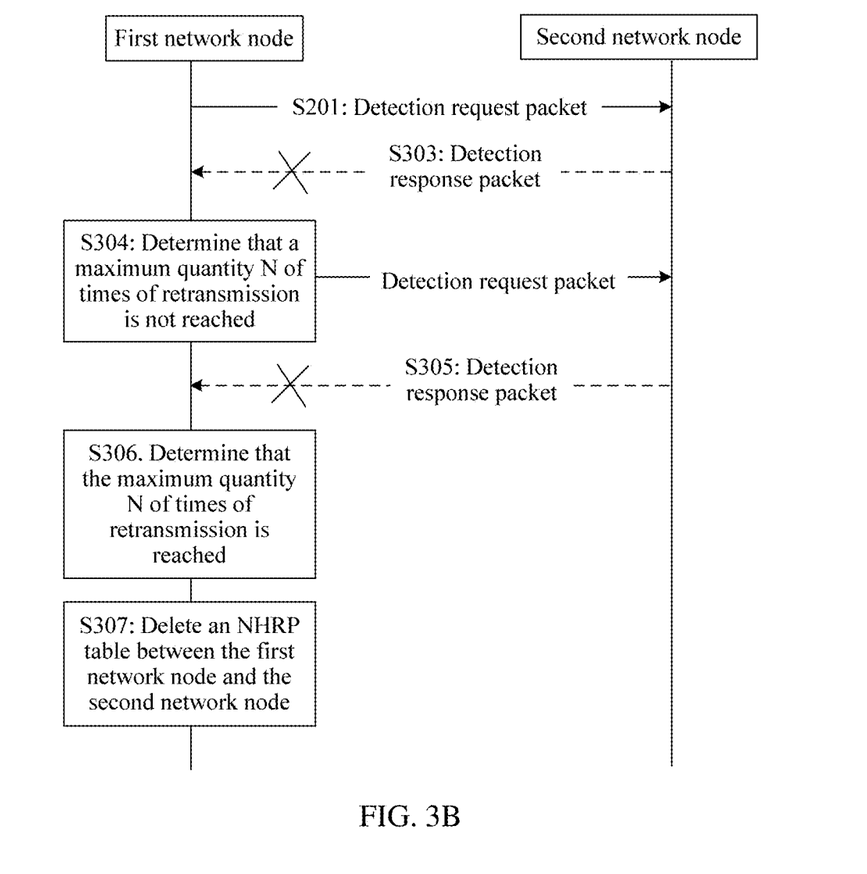
FIG. 3B is a schematic flowchart of another communications connection detection method according to an embodiment of this application.

Specifically, refer to FIG. 3A or FIG. 3B. After S201 in which the first network node sends the detection request packet to the second network node, S301 or S303 may be further included.

S301. The second network node sends the detection response packet to the first network node when receiving the detection request packet.

S302. The first network node receives, within the third preset duration, the detection response packet sent by the second network node, and determines that a link between the first network node and the second network node is normal.

S303. The first network node does not receive, within the third preset duration, the detection response packet sent by the second network node.

S304. The first network node determines that a maximum quantity N of times of retransmission is not reached, and resends the detection request packet to the second network node.

S305. The first network node does not receive, within the third preset duration, the detection response packet sent by the second network node.

S306. The first network node determines that the maximum quantity N of times of retransmission is reached.

S307. The first network node deletes the NHRP table between the first network node and the second network node.

The first network node may be a hub node or a spoke node. When the first network node is a hub node, the second network node is a spoke node. When the first network node is a spoke node, the second network node may be a hub node or may be a spoke node.

Figure 4:
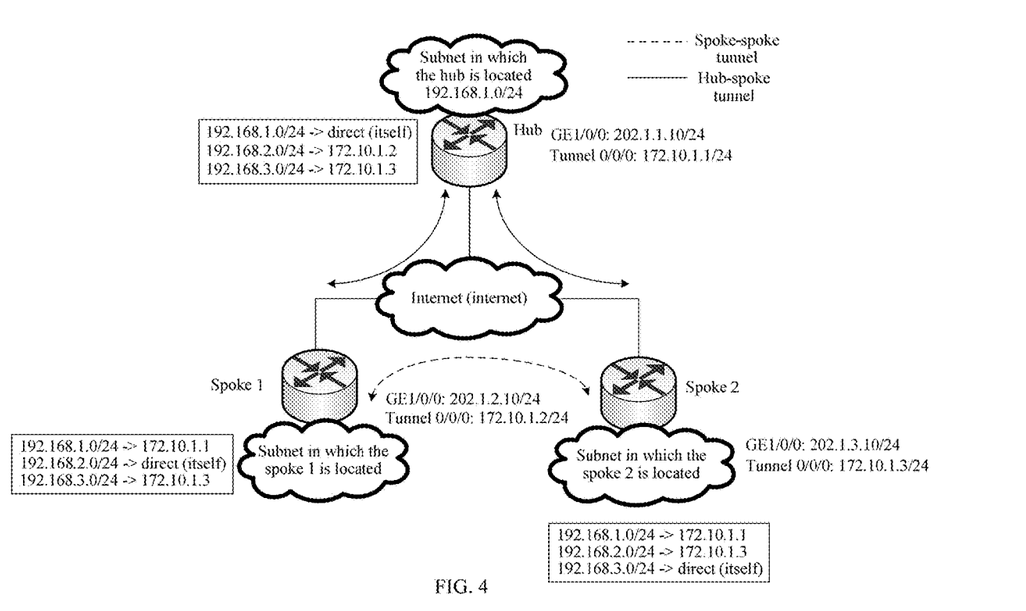
FIG. 4 is a schematic diagram of an NHRP table according to an embodiment of this application.

For example, as shown in FIG. 4, when an mGRE tunnel network is established, two spokes and a hub learn of an NHRP table and a routing table using an NHRP protocol.

An IP address of a subnet in which the hub is located is 192.168.1.0/24, a public IP address (GE1/0/0) of the hub is 202.1.1.10/24, and a tunnel interface address (tunnel 0/0/0) of the hub is 172.10.1.1/24. An IP address of a subnet in which a spoke 1 is located is 192.168.2.0/24, a public IP address of the spoke 1 is 202.1.2.10/24, and a tunnel interface address of the spoke 1 is 172.10.1.2/24. An IP address of a subnet in which a spoke 2 is located is 192.168.3.0/24, a public IP address of the spoke 2 is 202.1.3.10/24, and a tunnel interface address of the spoke 2 is 172.10.1.3/24.

A public IP address of each node may be considered as a non-broadcast multiple access network (NBMA) address. Same as an IP address of another physical interface, a tunnel interface address is also used in communication between the nodes (for example, obtaining routing information). An IP address of a node in a subnet is an IP address in a local area network.

The routing table is used to represent a correspondence between public IP addresses and tunnel interface addresses of different nodes. The NHRP table is used to represent an IP address of a next hop corresponding to a destination IP address of data traffic, as shown in blocks in FIG. 4. The destination IP address of the data traffic is an IP address of a subnet in which a target node is located, and the IP address of the corresponding next hop is a tunnel interface address of a tunnel established between a source node and the target node on the source node. For example, for data traffic sent from the spoke 1 to the spoke 2, a destination IP address of the data traffic is 192.168.3.0, and an IP address of a corresponding next hop is 172.10.1.2. Currently, if a link fault occurs between the spoke 1 and the spoke 2, an NHRP table between the spoke 1 and the spoke 2 does not automatically disappear before the NHRP table ages. Before the NHRP table ages, traffic to be sent from the spoke 1 to the spoke 2 is still sent after the NHRP table is queried such that a transmission resource of the spoke 1 is occupied.

Therefore, according to the solution provided in this embodiment of this application, the first network node serves as the detection initiation device, and after determining that the detection response packet sent by the second network node is not received, deletes the NHRP table used to forward the data traffic between the first network node and the second network node such that when a link fault occurs between the two nodes, it can be ensured that the data traffic is no longer sent and the transmission resource is no longer occupied.

In other approaches, keepalive between a spoke node and a hub node is implemented using a BFD packet. BFD is a conventional link detection method. The BFD packet may be applied to link detection between spoke nodes. The BFD detection first requires that all spoke nodes in an entire network support and are configured with a BFD protocol. However, in an asynchronous mode of the BFD protocol, a BFD packet is always sent periodically, exerting pressure on the spoke nodes in the entire network and resulting in a waste of resources.

In a possible implementation, when the first network node does not receive data traffic sent by the second network node, the first network node sends the detection request packet to the second network node. The first network node can determine that the link between the first network node and the second network node is normal when the data traffic transmitted by the second network node can be received.

Therefore, when the first network node does not receive the data traffic transmitted by the second network node, that is, when data traffic receiving is stopped, the first network node may send the detection request package to the second network node. The first network node may repeatedly send the detection request packet at a preset time interval, and stop sending the detection request packet until the detection response packet sent by the second network node is received or a preset quantity of times (for example, N times) of retransmission is reached. In this way, whether the traffic between the two nodes is stopped because of a link fault can be determined in advance, thereby improving reliability of discovering the link fault. In addition, resources are saved in comparison with other approaches.

In another possible implementation, when the first network node does not receive, within first preset duration, data traffic sent by the second network node, the first network node sends the detection request packet to the second network node. A reason why the first network node does not receive the data traffic sent by the second network node may be that the data traffic sent by the second network node to the first network node is transmitted completely. Therefore, the first network node may send the detection request packet to the second network node when duration in which the first network node does not receive the data traffic sent by the second network node reaches the first preset duration, that is, when duration in which data traffic receiving is stopped reaches the first preset duration. The first network node may repeatedly send the detection request packet at a preset time interval, and stop sending the detection request packet until the detection response packet sent by the second network node is received or a preset quantity of times (for example, N times) of retransmission is reached. In this way, whether the traffic between the two nodes is stopped because of a link fault can be determined in advance, thereby improving reliability of discovering the link fault.

In still another possible implementation, when the first network node does not receive data traffic sent by the second network node and stops sending data traffic to the second network node, the first network node sends the detection request packet to the second network node. When the first network node does not receive the data traffic sent by the second network node, the first network node does not trigger sending of the detection request packet if the first network node is sending the data traffic to the second network node, and the first network node sends the detection request packet to the second network node only when the first network node stops sending the data traffic to the second network node. In other words, the first network node sends the data traffic to the second network node only when the first network node does not send the data traffic to the second network node and does not receive the data traffic sent by the second network node. In comparison with the previous two possible implementations, more processing resources are saved.

In still another possible implementation, when duration in which the first network node does not receive data traffic sent by the second network node and stops sending data traffic to the second network node exceeds second preset duration, the first network node sends the detection request packet to the second network node.

In this embodiment of this application, the detection request packet may be an NHRP packet. Specifically, in this embodiment of this application, on a basis of an NHRP standard packet, a new packet type may be defined and used to detect whether the first network node and the second network node are in a connected mode.

The NHRP packet defined in this embodiment of this application may include a first field, and the first field is used to indicate that the NHRP packet is a packet used to detect whether the first network node and the second network node are in a connected mode. Refer to a field "type=10" shown in FIG. 5. When extension type=10, it indicates that the packet is a packet for detecting whether the first network node and the second network node are in a connected mode.

The NHRP packet defined in this embodiment of this application may further include a second field, and the second field is used by the second network node to detect whether the detection request packet is secure. The second field may be an authentication field in the NHRP packet. The first network node obtains a configured password, and generates content of the authentication field using the configured password. Therefore, when receiving the NHRP packet, the second network node determines, based on the configured password, whether the NHRP packet is secure. The authentication field may be located between a packet header and a data field in the NHRP packet.

The NHRP packet defined in this embodiment of this application may further include a third field, the third field is used to indicate a sequence number of the NHRP packet, and the sequence number is used to indicate whether the NHRP packet is a replay packet. Sequence numbers may be sequence numbers that increase from 1, the sequence numbers are not allowed to be duplicate, and each sequence number uniquely identifies one sent data traffic packet. The second network node defends against a replay packet attack based on the sequence number in combination with an anti-replay window and packet verification. For example, if the sequence number of the packet does not fall in the anti-replay window, the packet is considered as a normal packet. If the sequence number of the packet falls in the anti-replay window and falls on a right side of the anti-replay window, it is verified that the packet is a normal packet, and a right border of the anti-replay window is slid to the sequence number. If the sequence number of the packet falls on a left side of the anti-replay window, it is determined that the packet is a replay packet.

Figure 5:
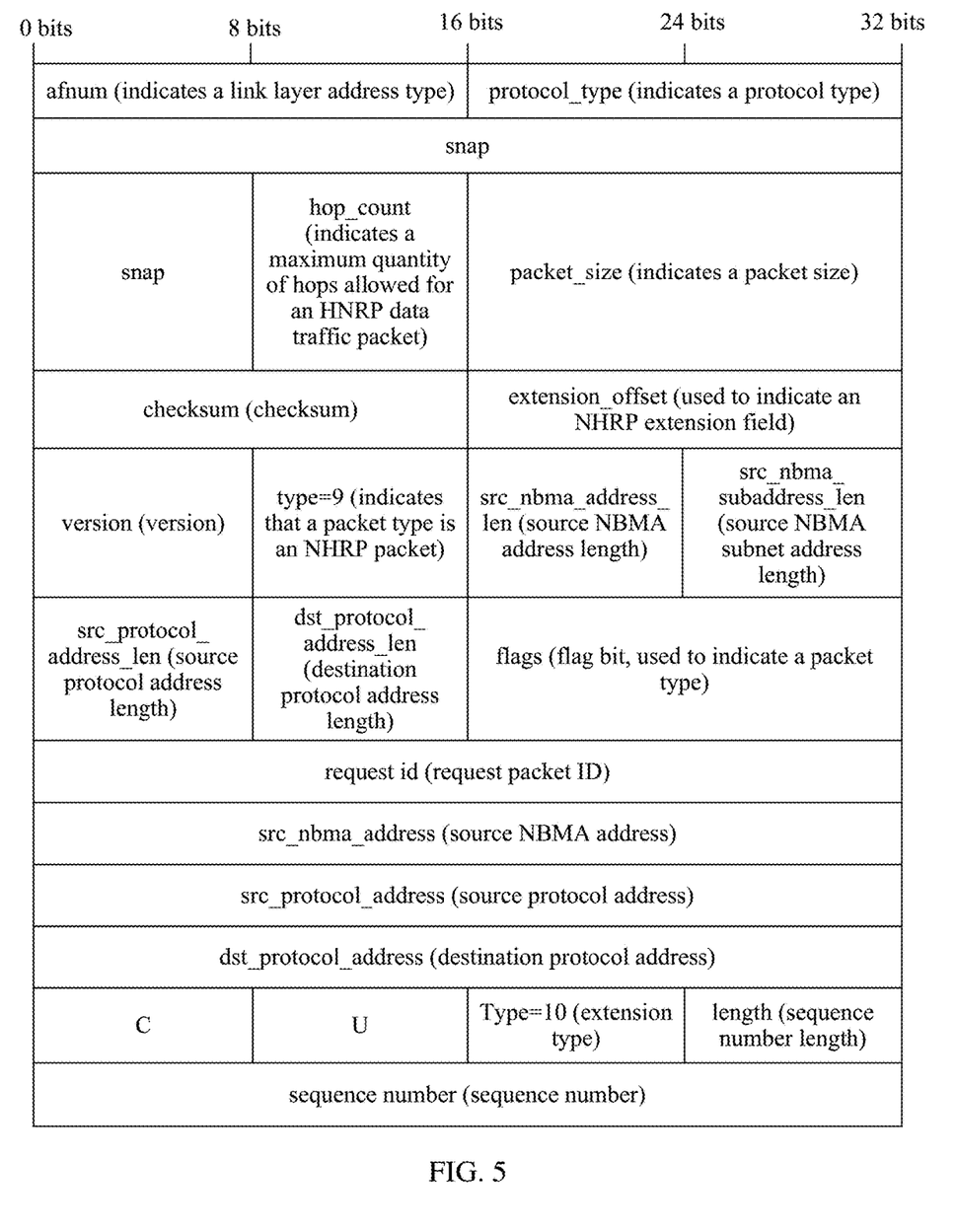
FIG. 5 is a schematic diagram of an NHRP packet according to an embodiment of this application.

FIG. 5 shows the NHRP packet defined in this embodiment of this application, where a "sequence number" field is the third field. The authentication field may be located behind the "sequence number" field shown in FIG. 5.

In FIG. 5, "snap" represents that the NHRP packet may use a subnetwork access protocol (SNAP) to encode transmitted data traffic, "protocol_type" represents a protocol type used by the Ethernet layer, "hop_count" represents a hop count and is used to indicate a maximum quantity of hops allowed for an NHRP packet, "packet_size" represents a size of the NHRP packet, "checksum" represents a checksum for correcting an error of an NHRP packet header, a source NBMA address is a public IP address of a source node, a source NBMA subnet address is a subnet address of the source node, a source protocol address is a tunnel interface address of the source node, a destination protocol address is a next hop address, that is, a tunnel interface address of a destination node to be detected, "C" is used to specify a function of the NHRP packet, and "U" is an unused bit.

In this embodiment of this application, an IPsec security association (SA) technology may be further used in an mGRE tunnel network. When the IPsec SA technology is used in the mGRE tunnel network, the detection request packet may be the foregoing NHRP packet, or a dead peer detection (DPD) packet in the IPsec SA technology may be used.

In this embodiment of this application, when the IPsec SA technology is used in the mGRE tunnel network, in step S202, when the first network node determines that the first network node does not receive the detection response packet sent by the second network node, the first network node may further delete IP security association information, and jointly delete the NHRP table used to forward the data traffic between the first network node and the second network node. The IP security association information is used to encrypt the data traffic transmitted between the first network node and the second network node. When a fault occurs in a transmission link between the first network node and the second network node, the IP security association information is deleted in time, thereby saving storage resources of the network nodes. In addition, the network nodes are prevented from encrypting the data traffic based on the IP security association information, thereby saving processing resources of the network node.

Optionally, when both the first network node and the second network node are branch nodes, when determining that the first network node does not receive the detection response packet sent by the second network node, the first network node deletes the IP security association information and the NHRP table that is used to forward the data traffic between the first network node and the second network node. In a manner, an aggregated routing function is restored by default after the IP security association information and the NHRP table are deleted. In another manner, an aggregated routing function is not restored by default after the IP security association information and the NHRP table are deleted. In this manner, after the first network node deletes the IP security association information and the NHRP table, an aggregated routing function between the first network node and the central node is restored such that the data traffic transmission between the first network node and the second network node may be forwarded by the central node. After a fault occurs in the link between the two branch nodes, forwarding by the central node may be restored, thereby restoring transmission of the data traffic between the branch nodes.

Optionally, in this embodiment of this application, when determining that the first network node does not receive the detection response packet sent by the second network node, the first network node determines that a fault occurs in the transmission link between the first network node and the second network node such that the first network node may send an alarm signal to a user, where the alarm signal is used to indicate that a fault occurs in the transmission link between the first network node and the second network node.

In addition, the alarm signal may be a warning sound (for example, a buzzing sound or an alarm sound) that can be heard by the user, may be a warning (for example, illumination light, flashing light, an image on a display, or prompt text on a display) that can be seen by the user, or may be an alarm (for example, vibration) that can be touched by the user. This is not specifically limited in this application.

In this embodiment of this application, if the first network node receives a detection request packet sent by the second network node, the first network node sends a detection response packet to the second network node such that the second network node determines that the link between the first network node and the second network node is normal.

Figure 6:
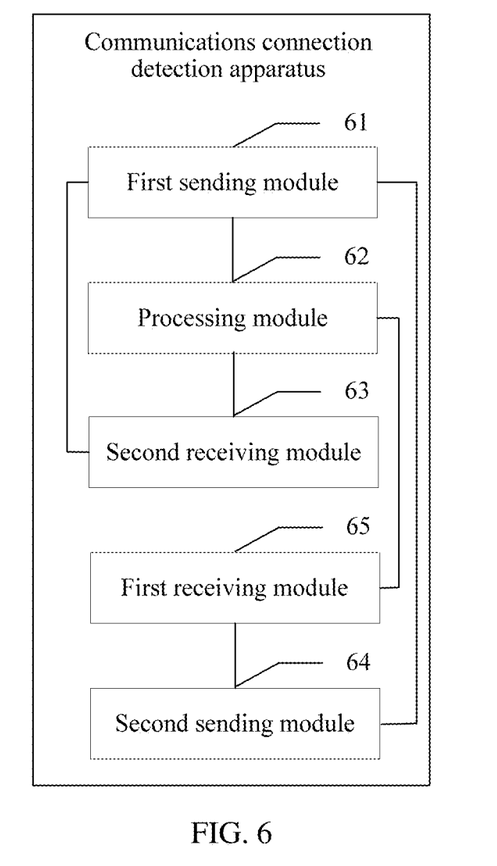
FIG. 6 is a schematic structural diagram of a communications connection detection apparatus according to an embodiment of this application.

Based on the same concept as the foregoing method embodiment, an embodiment of this application provides a communications connection detection apparatus. The apparatus may be applied to a first network node in an mGRE protocol tunnel network, and the apparatus is further configured to implement the method performed by the first network node in the embodiments shown in FIG. 2 to FIG. 5. As shown in FIG. 6, the apparatus may include a first sending module 61 configured to send a detection request packet to a second network node, where the detection request packet is used to detect whether the first network node and the second network node are in a connected mode, a first receiving module 65 configured to receive a detection response packet sent by the second network node, and a processing module 62 configured to delete, by the first network node, an NHRP table between the first network node and the second network node when determining that the first receiving module 65 does not receive the detection response packet sent by the second network node such that data traffic transmitted between the first network node and the second network node is forwarded by a central node, where the NHRP table is used by the first network node to send data traffic to the second network node using a tunnel established between the first network node and the second network node.

Optionally, the apparatus may further include a second receiving module 63 configured to receive data traffic sent by the second network node, and a second sending module 64 configured to send data traffic to the second network node, where the first sending module 61 is further configured to send the detection request packet to the second network node when it is determined that the data traffic sent by the second network node is not received, or send the detection request packet to the second network node when it is determined that the data traffic sent by the second network node is not received within first preset duration, or send the detection request packet to the second network node when it is determined that the data traffic sent by the second network node is not received and the second sending module 64 does not send the data traffic to the second network node, or send the detection request packet to the second network node when it is determined that duration in which the data traffic sent by the second network node is not received and the second sending module 64 does not send the data traffic to the second network node exceeds second preset duration.

Optionally, the apparatus may further include, when determining that the first receiving module 65 does not receive the detection response packet sent by the second network node, the processing module 62 is further configured to determine that the first receiving module 65 does not receive, within third preset duration, the detection response packet sent by the second network node, or determine that the first receiving module 65 does not receive, within third preset duration, the detection response packet sent by the second network node, and that after the first sending module 61 repeatedly sends the detection request packet to the second network node for N times, the first receiving module 65 does not receive the detection response packet sent by the second network node, where N is an integer greater than 1.

Optionally, the detection request packet is an NHRP packet, the NHRP packet includes a first field, and the first field is used to indicate that the NHRP packet is a packet used to detect whether the first network node and the second network node are in a connected mode.

Optionally, the NHRP packet further includes a second field, and the second field is used by the second network node to detect whether the detection request packet is secure.

Optionally, the NHRP packet further includes a third field, the third field is used to indicate a sequence number of the NHRP packet, and the sequence number is used to indicate whether the NHRP packet is a replay packet.

Optionally, the detection request packet is a DPD packet.

Optionally, the processing module 62 is further configured to delete IP security association information when determining that the first receiving module 65 does not receive the detection response packet sent by the second network node, where the IP security association information is used to encrypt the data traffic transmitted between the first network node and the second network node.

Optionally, both the first network node and the second network node are branch nodes. The processing module 62 is further configured to restore an aggregated routing function between the first network node and the central node when determining that the first receiving module 65 does not receive the detection response packet sent by the second network node, where the aggregated routing function is used by the processing module 62 to forward, using the central node, the data traffic transmitted between the first network node and the second network node.

Optionally, the processing module 62 is further configured to send an alarm signal when determining that the first receiving module 65 does not receive the detection response packet sent by the second network node, where the alarm signal is used to indicate that a fault occurs in a transmission link between the first network node and the second network node.

Module division in the embodiments of this application is an example, is merely logical function division, and may be another division in actual implementation. In addition, functional modules in the embodiments of this application may be integrated into one or more processors, or each of the modules may exist alone physically, or two or more modules may be integrated into one module. The integrated module may be implemented in a form of hardware, or may be implemented in a form of a software functional module. Therefore, the method in any of the foregoing embodiments of this application may be implemented by one or more processors in the first network node. The first network node described herein may be a branch node, or may be a central node. In the embodiments of this application, a structure of the first network node is the same as that of the second network node. For the structure of the second network node, refer to the first network node. Details are not described again.

Figure 7:
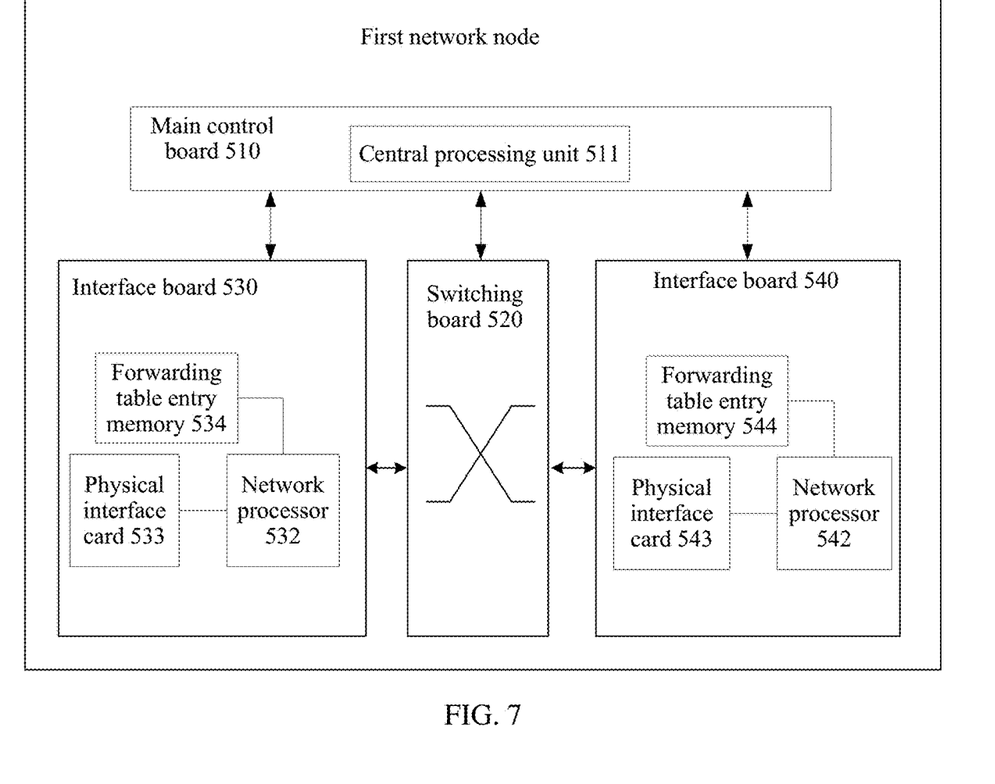
FIG. 7 is a schematic structural diagram of a first network node according to an embodiment of this application.
Figure 8:
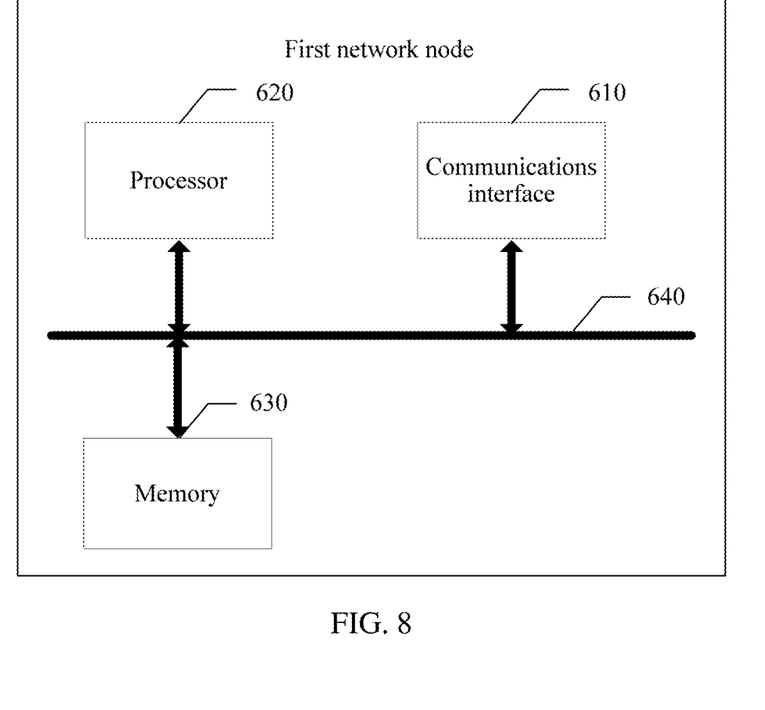
FIG. 8 is a schematic structural diagram of another first network node according to an embodiment of this application.

When implemented using hardware, the first network node may be implemented using a structure shown in FIG. 7, or may be implemented using a structure shown in FIG. 8.

FIG. 7 is a schematic structural diagram of a first network node according to an embodiment of this application. The first network node may include a main control board 510, a switching board 520, an interface board 530, and an interface board 540. The main control board 510 includes a central processing unit 511. The interface board 530 includes a memory 534, a network processor 532, and a physical interface card 533. The interface board 540 includes a memory 544, a network processor 542, and a physical interface card 543.

The switching network board 520 is mainly configured to forward a data traffic packet between the interface board 530 and the interface board 540.

The interface board 530 serves as a receiving board, and the interface board 540 serves as a sending board.

When detecting, based on a detection interval (first preset duration) configured by an operation manager (OM), that data traffic sent by a second network node is not received in the configured detection interval, the network processor 532 considers that the traffic is abnormal, and sends a detection request message to the central processing unit 511.

After receiving the detection request message, the central processing unit 511 constructs a detection request packet, queries a local routing table according to a destination address of the detection request packet to find the interface board 530 on which an outbound interface is located, and then delivers the detection request packet to the network processor 532.

The network processor 532 sends, based on information such as the outbound interface, the detection request packet using the physical interface card 533 after completing link layer encapsulation, that is, sends the detection request packet to the second network node.

After receiving, from a network, a detection response packet sent by the second network node, the physical interface card 543 sends the detection response packet to the network processor 542.

The physical interface card 543 receives the detection response packet from the network, and after completing related verification, submits the detection response packet to the network processor 542 for processing.

The network processor 542 queries, using a destination address of the detection response packet, an NHRP table stored in the memory 544, determines that the detection response packet is a local packet, and sends the detection response packet to the central processing unit 511 for processing.

The central processing unit 511 performs matching with the detection request packet based on information such as a detection address and a sequence number carried in the received detection response packet. If the matching succeeds, it is considered that a link state is normal. If the central processing unit 511 does not receive, within third preset duration, the detection response packet sent by the second network node, the detection request packet is retransmitted for limited times. If the detection response packet sent by the second network node is not received after the detection request packet is retransmitted for N times, it is determined that a fault occurs in a link between the first network node and the second network node, the link may be set to DOWN, and NHRP tables stored in the memory 544 and the memory 534 and used to forward data traffic between the first network node and the second network node are deleted.

Optionally, the physical interface card 543 receives, from the network, a detection request packet sent by the second network node, and submits the detection request packet to the network processor 542 for processing.

The network processor 542 queries a local route table using a destination address of the detection request packet, determines that the detection request packet is a local packet, and sends the detection request packet to the central processing unit 511 for processing.

After performing verification according to packet characteristic information of the received detection request packet, the central processing unit 511 determines that the detection request packet is a packet used to detect whether the first network node and the second network node is in a connected mode, and constructs a detection response packet. The central processing unit 511 queries, based on a destination address of the detection response packet, the NHRP table stored in the memory 534, to find the interface board 530 on which the outbound interface is located, and then delivers the detection response packet the network processor 532.

The network processor 532 sends, based on information such as the outbound interface, the detection response packet using the physical interface card 533 after completing link layer encapsulation, that is, sends the detection response packet to the second network node.

FIG. 8 is a schematic structural diagram of another first network node according to an embodiment of this application. The first network node includes a communications interface 610, a processor 620, and a memory 630. The processor 620 receives and sends data traffic, a detection request packet, and a detection response packet using the transceiver 610, and is configured to implement the method executed by the first network node in FIG. 2 to FIG. 4. In an implementation process, steps in a processing procedure may be completed using a hardware integrated logic circuit in the processor 620 or an instruction in a form of software. The processor 620 includes one or more of a general purpose processor, a network processor, a digital signal processor, an application-specific integrated circuit, a field programmable gate array or another programmable logic device, a discrete gate or a transistor logic device, a discrete hardware component, or the like, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed using a combination of hardware in the processor and a software unit. Program code executed by the processor 620 to implement the foregoing method may be stored in the memory 630. The memory 630 may be a nonvolatile memory such as a hard disk drive (HDD) or a solid state drive (SSD), or may be a volatile memory such as a random access memory (RAM). The memory 630 is any other medium that can be configured to carry or store expected program code in a form of an instruction or a data structure and that can be accessed by a computer, without being limited thereto.

In this embodiment of this application, a specific connection medium between the transceiver 610, the processor 620, and the memory 630 is not limited. In this embodiment of this application, the memory 630, the processor 620, and the transceiver 610 are connected using a bus 640 in FIG. 8. The bus is represented using a bold line in FIG. 8. A manner of connection between other components is merely an example for description, and imposes no limitation. The bus may be classified into an address bus, a data bus, a control bus, and the like. For ease of representation, only one bold line is used to represent the bus in FIG. 8, but this does not mean that there is only one bus or only one type of bus.

Based on the foregoing embodiments, an embodiment of this application further provides a computer storage medium. The storage medium stores a software program, and when the software program is read and executed by one or more processors, the method provided in the foregoing embodiments may be implemented. The computer storage medium may include any medium that can store program code, such as a universal serial bus (USB) flash drive, a removable hard disk, a read-only memory, a random access memory, a magnetic disk, or an optical disc.

Based on the foregoing embodiments, an embodiment of this application further provides a chip system. The chip system includes a processor configured to support a distributed unit, a centralized unit, and a base station in implementing a function in the foregoing embodiments, for example, generating or processing data and/or information in the foregoing method. Optionally, the chip system further includes a memory, and the memory is configured to store a program instruction and data that are necessary for the distributed unit, the centralized unit, and a network node. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc-read only memory (CD-ROM), an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the claims of this application and their equivalent technologies.

What is claimed is:

1. A communications connection detection method, implemented by a first network node, wherein the communication connection detection method comprises:
 sending a detection request packet to a second network node, wherein the detection request packet is for detecting whether the first network node and the second network node are in a connected mode;

determining that the first network node does not receive a detection response packet from the second network node response to the detection request packet; and deleting a next hop resolution protocol (NHRP) table and Internet Protocol (IP) security association information when the first network node determines that the first network node does not receive the detection response packet, wherein the NHRP table is for forwarding data traffic to the second network node using a tunnel established between the first network node and the second network node, and wherein the IP security association information is for encrypting the data traffic transmitted between the first network node and the second network node.

2. The communications connection detection method of claim 1, further comprising transmitting the data traffic to the second network node through a central node.

3. The communications connection detection method of claim 1, wherein the first network node sends the detection request packet to the second network node when any one of the following conditions is met:

the first network node does not receive the data traffic from the second network node;

the first network node does not receive the data traffic from the second network node within a first preset duration;

the first network node does not receive the data traffic from the second network node, and the first network node does not send the data traffic to the second network node; or a duration in which the first network node does not receive the data traffic from the second network node and the first network node does not send the data traffic to the second network node exceeds a second preset duration.

4. The communications connection detection method of claim 1, further comprising:

determining that the detection response packet from the second network node is not received within a first preset duration; or determining that the detection response packet from the second network node is not received within the first preset duration and determining that the detection response packet from the second network node is not received after the detection request packet is sent to the second network node N times, wherein N is an integer greater than 1.

5. The communications connection detection method of claim 1, wherein the detection request packet is an NHRP packet, wherein the NHRP packet comprises a first field, and wherein the first field indicates that the NHRP packet is for detecting whether the first network node and the second network node are in the connected mode.

6. The communications connection detection method of claim 5, wherein the NHRP packet further comprises a second field, and wherein the second field is for detecting whether the detection request packet is secure.

7. The communications connection detection method of claim 5, wherein the NHRP packet further comprises a third field, wherein the third field indicates a sequence number of the NHRP packet, and wherein the sequence number indicates whether the NHRP packet is a replay packet.

8. The communications connection detection method of claim 1, further comprising restoring an aggregated routing function between the first network node and a central node, wherein the aggregated routing function is for forwarding the data traffic transmitted between the first network node and the second network node using the central node.

9. A communications connection detection apparatus, wherein the communications connection detection apparatus is applied to a first network node and comprises:

a first transmitter configured to send a detection request packet to a second network node, wherein the detection request packet is used to detect whether the first network node and the second network node are in a connected mode;

a first receiver configured to receive a detection response packet from the second network node; and a processor configured to:

determine that the first receiver does not receive the detection response packet from the second network node in response to the detection response packet; and delete a next hop resolution protocol (NHRP) table and Internet Protocol (IP) security association information when determining that the first receiver does not receive the detection response packet, wherein the detection response packet is in response to the detection request packet, wherein the NHRP table is used by the first network node to send data traffic to the second network node using a tunnel established between the first network node and the second network node, and wherein the IP security association information is for encrypting the data traffic between the first network node and the second network node.

10. The communications connection detection apparatus of claim 9, wherein the processor is further configured to transmit the data traffic to the second network node through a central node.

11. The communications connection detection apparatus of claim 9, further comprising:

a second receiver configured to receive the data traffic from the second network node; and a second transmitter configured to send the data traffic to the second network node, wherein the first transmitter is further configured to send the detection request packet to the second network node when one of the following conditions is met:

the second receiver does not receive the data traffic from the second network node;

the second receiver does not receive the data traffic from the second network node within a first preset duration;

the second receiver does not receive the data traffic from the second network node, and the second transmitter does not send the data traffic to the second network node; or a duration in which the second receiver does not receive the data traffic from the second network node and the second transmitter does not send the data traffic to the second network node exceeds a second preset duration.

12. The communications connection detection apparatus of claim 9, wherein the processor is further configured to:

determine that the first receiver does not receive the detection response packet from the second network node within a first preset duration; or determine that the first receiver does not receive the detection response packet from the second network node within the first preset duration and determining that the first receiver does not receive the detection response packet from the second network node after the first transmitter sends the detection request packet to the second network node N times, wherein N is an integer greater than 1.

13. The communications connection detection apparatus of claim 9, wherein the detection request packet is an NHRP packet, wherein the NHRP packet comprises a first field, and wherein the first field indicates that the NHRP packet is used to detect whether the first network node and the second network node are in the connected mode.

14. The communications connection detection apparatus of claim 13, wherein the NHRP packet further comprises a second field, and wherein the second field is used by the second network node to detect whether the detection request packet is secure.

15. The communications connection detection apparatus of claim 13, wherein the NHRP packet further comprises a third field, wherein the third field indicates a sequence number of the NHRP packet, and wherein the sequence number indicates whether the NHRP packet is a replay packet.

16. The communications connection detection apparatus of claim 9, wherein the processor is further configured to restore an aggregated routing function between the first network node and a central node when determining that the first receiver does not receive the detection response packet from the second network node, and wherein the aggregated routing function is used by the processor to forward the data traffic transmitted between the first network node and the second network node using the central node.

17. A communications connection detection network node, comprising:
a communications interface configured to send and receive data;
a processor coupled to the communications interface; and
a memory coupled to the processor and storing instructions that, when executed by the processor, cause the communications connection detection network node to be configured to:
send a detection request packet to a second network node, wherein the detection request packet is used to detect whether the communications connection detection network node and the second network node are in a connected mode;
determine that the communications connection detection network node does not receive a detection response packet from the second network node in response to the detection request packet; and
delete a next hop resolution protocol (NHRP) table and Internet Protocol (IP) security association information when the communications connection detection network node determines that the communications connection detection network node does not receive the detection response packet, wherein the detection response packet is in response to the detection request packet, wherein the NHRP table is used by the communications connection detection network node to forward data traffic to the second network node using a tunnel established between the communications connection detection network node and the second network node, and wherein the IP security association information is for encrypting the data traffic between the communications connection detection network node and the second network node.

18. The communications connection detection network node of claim 17, wherein the instructions further cause the communications connection detection network node to further send the detection request packet to the second network node when any one of the following conditions is met:
the communications connection detection network node does not receive the data traffic from the second network node;
the communications connection detection network node does not receive the data traffic from the second network node within a first preset duration;
the communications connection detection network node does not receive the data traffic from the second network node and the communications connection detection network node does not send the data traffic to the second network node; or
a duration in which the communications connection detection network node does not receive the data traffic from the second network node and the communications connection detection network node does not send the data traffic to the second network node exceeds a second preset duration.

19. The communications connection detection network node of claim 17, further comprising:
determining that the detection response packet from the second network node is not received within a first preset duration; or
determining that the detection response packet from the second network node is not received within the first preset duration and determining that the detection response packet from the second network node is not received after the detection request packet is sent to the second network node N times, wherein N is an integer greater than 1.

20. The communications connection detection network node of claim 17, wherein the detection request packet is an NHRP packet, wherein the NHRP packet comprises a first field, and wherein the first field indicates that the NHRP packet detects whether the communications connection detection network node and the second network node are in the connected mode.

* * * * *